United States Patent
Williams et al.

(10) Patent No.: US 12,287,845 B2
(45) Date of Patent: Apr. 29, 2025

(54) OPERATION OF A DISTRIBUTED DETERMINISTIC NETWORK

(71) Applicant: DFINITY STIFTUNG, Zürich (CH)

(72) Inventors: Dominic Williams, Palo Alto, CA (US); Jan Camenisch, Thalwil (CH); Timo Hanke, Palo Alto, CA (US)

(73) Assignee: DFINITY STIFTUNG, Zürich (CH)

( * ) Notice: Subject to any disclaimer, the term of this patent is extended or adjusted under 35 U.S.C. 154(b) by 0 days.

(21) Appl. No.: 18/028,730

(22) PCT Filed: Sep. 30, 2021

(86) PCT No.: PCT/EP2021/077009
§ 371 (c)(1),
(2) Date: Mar. 27, 2023

(87) PCT Pub. No.: WO2022/069669
PCT Pub. Date: Apr. 7, 2022

(65) Prior Publication Data
US 2023/0291656 A1    Sep. 14, 2023

Related U.S. Application Data

(60) Provisional application No. 63/085,502, filed on Sep. 30, 2020.

(51) Int. Cl.
*G06F 11/34* (2006.01)
*G06F 17/18* (2006.01)

(52) U.S. Cl.
CPC .......... *G06F 17/18* (2013.01); *G06F 11/3409* (2013.01)

(58) Field of Classification Search
CPC ....... G06F 11/34; G06F 11/3409; G06F 17/18
See application file for complete search history.

(56) References Cited

U.S. PATENT DOCUMENTS

| | | | |
|---|---|---|---|
| 2014/0016469 A1* | 1/2014 | Ho | H04L 1/0041 370/235 |
| 2020/0026548 A1* | 1/2020 | Huang | G06F 16/2379 |

(Continued)

FOREIGN PATENT DOCUMENTS

WO    2020187413 A1    9/2020

OTHER PUBLICATIONS

"International Search Report for PCT Application No. PCT/EP2021/077009", mailed Dec. 20, 2021, 3 pages.

(Continued)

*Primary Examiner* — Kamini B Patel
(74) *Attorney, Agent, or Firm* — Mannava & Kang, P.C.

(57) ABSTRACT

According to an embodiment of a first aspect of the invention, there is provided a computer-implemented method for operating a distributed network. The distributed network comprises a plurality of nodes. The network comprises one or more subnets. The method comprises steps of running a set of computational units and assigning each of the computational units to one of the plurality of subnets according to a subnet-assignment, thereby creating an assigned subset of the set of computational units for each of the subnets. The method further comprises running on each node of the plurality of subnets the assigned subset of the computational units, wherein the computational units are configured to execute computations in a deterministic manner, thereby replicating the assigned subsets of the computational units on replicas across the respective subnet. The method further comprises running a consensus component, the consensus component being configured to reach a consensus on input blocks to be processed by the replicas of a respective subnet. The method further comprises measuring, by each of the replicas of a subnet, replica-local data, reporting, by each of the replicas of a subnet, the replica-local data to the con- (Continued)

sensus component and utilizing the replica-local data for an analysis, in particular a statistical analysis, of the computations executed across the respective subnet. Further aspects of the invention relate to a corresponding distributed network, a node, a computer program product and a software architecture.

20 Claims, 8 Drawing Sheets

(56) References Cited

U.S. PATENT DOCUMENTS

| | | | |
|---|---|---|---|
| 2020/0117825 A1* | 4/2020 | Vaswani | H04L 9/3239 |
| 2020/0244576 A1* | 7/2020 | Wetterwald | H04L 45/74 |
| 2020/0402170 A1* | 12/2020 | Konduru | H04L 67/10 |
| 2021/0111982 A1* | 4/2021 | Nelson | G06F 11/3688 |
| 2021/0203477 A1* | 7/2021 | Zhu | H04L 9/0618 |
| 2022/0271957 A1* | 8/2022 | Zamani | H04L 9/3239 |
| 2024/0073043 A1* | 2/2024 | Yu | G06F 18/22 |

OTHER PUBLICATIONS

Gang Wang, et al., " SoK: Sharding on Blockchain", Oct. 10, 2019, pp. 1-21.
"International Preliminary Report for PCT Application No. PCT/EP2021/077009", mailed Jan. 3, 2023, 65 pages.

* cited by examiner

800

900

1000

OPERATION OF A DISTRIBUTED DETERMINISTIC NETWORK

CLAIM FOR PRIORITY

The present application is a national stage filing under 35 U.S.C 371 of PCT application number PCT/EP2021/077009, having an international filing date of Sep. 30, 2021, which claims priority to U.S. patent application No. 63/085,502, having a filing date of Sep. 30, 2020, the disclosures of which are hereby incorporated by reference in their entireties.

TECHNICAL FIELD

The present invention pertains to a method for operating a distributed network, the distributed network comprising a plurality of subnets. Each subnet comprises a plurality of nodes.

Further aspects relate to a corresponding distributed network, a node of a distributed network, a corresponding computer program product and a software architecture encoded on a non-transitory medium.

BACKGROUND ART

In distributed networks a plurality of nodes are arranged in a distributed fashion. In distributed networks computing, software and data are spread out across the plurality of nodes. The nodes establish computing resources and the distributed networks may use distributed computing techniques.

An example of distributed networks are blockchain networks. Blockchain networks are consensus-based, electronic ledgers based on blocks. Each block comprises transactions and other information. Furthermore, each block contains a hash of the previous block so that blocks become chained together to create a permanent, unalterable record of all transactions which have been written to the blockchain. Transactions may contain small programs known e.g. as smart contracts.

In order for a transaction to be written to the blockchain, it must be "validated" by the network. In other words, the network nodes have to gain consent on blocks to be written to the blockchain. Such consent may be achieved by various consensus protocols.

One type of consensus protocols are proof-of-work consensus protocols. A proof-of-work consensus protocol generally requires some work from the parties that participate in the consensus protocol, usually corresponding to processing time by a computer. Proof-of-work-based cryptocurrency systems such as Bitcoin involve the solving of computationally intensive puzzles to validate transactions and to create new blocks.

Another type of consensus protocols are proof-of-stake-consensus protocols. Such proof-of-stake protocols have the advantage that they do not require time-consuming and energy-intensive computing. In proof-of-stake based blockchain networks e.g. the creator of the next block is chosen via combinations of random selection as well as the stake of the respective node in the network.

Apart from cryptocurrencies, distributed networks may be used for various other applications. In particular, they may be used for providing decentralized and distributed computing capabilities and services.

WO 2020/187413 A1 discloses a distributed network comprising a plurality of network nodes. Each of the plurality of network nodes is linked to a first node identity of a plurality of first node identities. Each of the plurality of first node identities comprises a first verification key of a public-key signature scheme. The distributed network is configured to perform a key shuffling step adapted to perform an unlinkable one-to-one mapping between the plurality of first node identities and a plurality of second node identities. Each of the plurality of second node identities comprises a second verification key of a public-key signature scheme. The distributed network is configured to perform a consensus protocol with a subset of the plurality of second node identities. The document by Gang Wang ET AL: SoK: Sharding on Blockchain, IACR, INTERNATIONAL ASSOCIATION FOR CYRPTOLOGY RESEARCH, vol. 20191010:125541, 10 Oct. 2019, describes that sharding has emerged as a good candidate that can overcome both the scalability and performance problems in blockchain. The document provides a systematic and comprehensive review on blockchain sharding techniques including a general design flow of sharding protocols and a discussion of key design challenges.

Accordingly, there is a need for distributed networks with enhanced functionalities.

DISCLOSURE OF THE INVENTION

One object of an aspect of the invention is to provide a method for operating a distributed network with enhanced functionalities, in particular in terms of security, efficiency and/or fairness.

According to an embodiment of a first aspect of the invention, a computer-implemented method for operating a distributed network is provided. The distributed network comprises a plurality of nodes and one or more subnets. The method comprises steps of running a set of computational units and assigning each of the computational units to one of the one or more subnets according to a subnet-assignment, thereby creating an assigned subset of the set of computational units for each of the subnets. The method further comprises running on each node of the one or more subnets the assigned subset of the computational units, wherein the computational units are configured to execute computations in a deterministic manner, thereby replicating the assigned subsets of the computational units on replicas across the respective subnet. The method further comprises running a consensus component, the consensus component being configured to reach a consensus on input blocks to be processed by the replicas of a respective subnet. The method further comprises measuring, by each of the replicas of a subnet, replica-local data and reporting, by each of the replicas of a subnet, the replica-local data to the consensus component of the subnet. The replica-local data comprises non-deterministic measurands of the executed computations.

The embodied method further comprises utilizing the replica-local data for an analysis, in particular a statistical analysis, of computations executed across the respective subnet. The embodied method further comprises taking one or more actions in dependence on the analysis of the replica-local data.

Such an embodied method provides advantageous network operations. In particular, such a method allows to measure replica-local data by the nodes of the subnet and to use this replica-local data for an analysis of the computations executed across the respective subnet.

According to embodiments, replica-local data may be defined as any local data of a replica, in particular any data on which the replicas of a respective subnet do not have reached a consensus on, i.e. which has not run through the consensus component of the subnet.

According to such an embodied method the replicas of the subnet itself are used to measure the replica-local data and report these data to the consensus component. Then the replica-local data may be used for an analysis of the subnet.

This method can be used to observe the replicas in order to detect malicious, poor or passive behaviour, e.g. a free-riding of replicas. Free-riding may be described as optimistically following, but short-cutting, the protocol with the goal of saving resources and/or expenses. It is not actively malicious.

Furthermore, such an embodied method may be used to observe the computational units running on the replicas in order to detect below-average performance of certain computational units. The below-average performance can be caused by poorly programmed or maliciously programmed computational units or by maliciously crafted input from a user to the computational units. In particular, such an embodied method may be used to detect and eliminate resource exhaustion attacks by computational units or users.

In addition, methods according to embodiments of the invention may be used to increase fairness in charging the computational units for the use of network resources despite non-deterministic effects.

According to embodiments the replica-local data is data pertaining to the computations being locally executed by the corresponding replica.

While the results of the computations, namely the execution states of the computational units, are the same on all replicas, the efficiency and performance, e.g. in terms of the use of processing resources of the nodes such as memory bus and caches, may differ from replica to replica. Hence according to an embodiment the replica-local data may be in particular data pertaining to the computations being locally executed by the corresponding replica. This data may encompass in particular non-deterministic data, in particular non-deterministic measurands of the executed computations.

According to embodiments the replica-local data is data comprising numeric or enumerable quantities. Such numeric or enumerable data includes boolean data.

Measuring numeric or enumerable data facilitates an efficient analysis of the data. More particularly, it allows an efficient comparison of the data and further facilitates an efficient implementation of an action logic to take appropriate actions to improve the operation of the subnet.

For example, one measurand may pertain to the wall clock time that executions for a given computational unit take, measured by the replica. More precisely, the replica may measure the ratio of the replica-local wall clock time to the logical time. Here, the logical time required for a given execution is deterministic and the same on all replicas, whereas the wall-clock time is non-deterministic and depends on replica-local effects such as the use of the memory bus and the state of caches on the replica.

The actions may be generally any measures to improve the operation of the subnet. The actions may be performed according to embodiments by a system computational unit of the subnet. Such a system computational unit receives the reported replica-local data, preferably in an analysed form, and may decide in dependence on this data on the actions to be taken.

According to embodiments, the actions may comprise e.g. adjusting bounds and/or prices for one or more of the computational units of the subnet. Such bounds may be e.g. the logical time allocated to the computational units. The price may be a price which is charged to the computational units by the network for the use of processing and network resources of the network. Such price may be set in a local currency of the network and is sometimes referred to as gas.

In the same or a similar manner the subnet may also adjust bounds and/or prices for users of the distributed network, in particular for users that uses the computational units which are run on the respective subnet.

Furthermore, according to embodiments misbehaving or poorly behaving replicas may be banned or in other words eliminated from the network.

According to an embodiment, the method may comprise a step of computing, by the respective subnet, a set of geometric median values of the replica-local data across the subnet.

More particularly, each of the replicas of the subnet may provide the replica-local data and then the median value of the respective replica local-data is computed across the subnet. Taking the median value has the advantage that malicious or misbehaving replicas cannot influence the final value that is used for the subsequent analysis of the subnet operation. In this respect embodiments of the invention provide the advantage that the final value cannot be skewed so much by providing extremely large or small values by a malicious node or a malicious computational unit.

According to an embodiment, a statistical analysis of the set of median values may then be performed and one or more actions may be taken in dependence on the result of the statistical analysis.

According to an embodiment, the statistical analysis may involve the application of methods configured to ignore outliers, in particular a method that comprises the computation of a geometric median.

According to an embodiment the statistical analysis may be performed robustly in the sense that its outcome is not influenced by the outliers of reported replica-local measurands. A statistical analysis that starts with taking median values is one exemplary embodiment of a robust statistical analysis.

According to an embodiment, it is assumed/expected that up to f malicious replicas are present in a subnet. The statistical analysis may then only proceed if at least 2f+1 reports from different replicas are present. The statistical analysis may then discard the f lowest and f highest values and only take into account the remaining values.

According to embodiments the statistical analysis may involve computing a deviation of the set of median values from an expected value and taking the one or more actions in dependence on the deviation. As an example, computational units which have a resource consumption that deviates more than a predefined percentage from the expected value may be subject to an action such as a reduction of the allocated logical time.

In addition to an analysis of the median values, a statistical analysis of further data may be performed. The further data may be in particular data which is publicly verifiable blockchain data, i.e. data that is available to everyone and which hence does not need to be reported (anymore) to the consensus component. According to other embodiments the further data may come from a trusted source or trusted provider.

According to an embodiment the components which are responsible for the analysis and the action may take the one or more actions in dependence on the statistical analysis of the replica-local data, the set of median values and/or the further data.

According to an embodiment, the subnet may provide a time window for the reporting of the replica-local data by the replicas of the subnet. Such a time window may be predefined by the subnet and implemented e.g. as code in the subnet client. As an example, the time window may be specified e.g. in terms of a predefined number of input blocks. Such a time window facilitates a regular analysis of the behaviour of the subnet components.

According to an embodiment, the replica-local data may be data on the resource consumption of the computational units on the replica, in particular the wall clock time of execution and/or the maximum memory allocated during execution. This is non-deterministic data which may differ from replica to replica.

According to an embodiment, the replica-local data may be data on the resource consumption of users on the replica, in particular the logical time and/or logical time of execution performed on behalf of the user and/or the maximum memory allocated during execution performed on behalf of the user.

According to an embodiment, the replica-local data may be data on measurements of other replicas that the replica communicates with. A replica that the replica communicates with may be on the same subnet or on a different subnet. Furthermore, it may mean that the two replicas have established a permanent communication link, e.g. according to an overlay topology, or it may mean that the two replicas communicate only sporadically over a non-permanent communication link. Furthermore, it may refer to a case in which the two replicas are part of a gossip network.

According to an embodiment, for each other replica that the replica communicates with, the replica-local data may be data
- on measurements of first parameters, in particular on communication parameters of the other replica with the replica, in particular latency, response time, down time and/or reliability. Such communication parameters may be also denoted as low-level communication parameters.

According to an embodiment, for each other replica that the replica communicates with, the replica-local data may be data on measurements of second parameters, in particular on semantic communication parameters of the other replica with the replica, such as correctness according to a protocol specification, e.g. a subnet protocol specification. Such communication parameters may be denoted as high-level communication parameters.

According to an embodiment, for each other replica on the subnet, the replica-local data may be data on measurements about the activity of the other replica in the consensus protocol as observed by the replica, such as the number of proposals of input blocks and/or the number of signature shares produced by the other replica. In this embodiment it is not necessary that the replica has directly communicated with the other replica on which it took the measurement.

According to an embodiment, the further data may be data from a trusted source, in particular a blockchain. According to such an embodiment, the further data may be the number of blocks in a given section of that blockchain that were proposed by each replica. Blocks that are part of an agreed upon blockchain may be called finalized blocks. Moreover, according to an embodiment, the further data may be the number of times that each replica has participated in a multi-signature for all multi-signatures that appear in a block of a given section of the blockchain.

According to embodiments, the replicas of the subnet may process non-replicated executions on behalf of users. Such non-replicated executions may not be intended to go through consensus, run on any other replica or alter the replicated state. Such non-replicated executions may be called query calls. In such an embodiment the replica-local data may be data on the resource consumption of query calls for each computational unit or for each user. Such an embodied method provides an advantageous way to charge computational units and/or users for query charges, e.g. in the form of gas. In particular, a computational unit may be charged an amount proportional to the median of the gas costs that it incurred across all replicas.

In this respect, gas may be defined as a complementary accounting unit that is used by the distributed network to charge for the use of its resources and is separate from the native currency of the network. Gas may also be denoted as fuel or cycles. Providing a complementary accounting unit provides the advantage that the costs for the use of the resources can be kept stable and independent from market fluctuations of the native currency. As an analogy to a car, where fuel or gas is needed to run a car, the gas according to embodiments of the invention is needed to run the resources of the distributed network.

According to embodiments, the subnets may also be denoted as replicated computing clusters. In such replicated computing cluster the computational units that have been assigned to a respective subnet are run on each node of the subnet and are hence replicated across the subnet, thereby traversing the same chain of execution states.

According to an embodiment of another aspect of the invention, a distributed network is provided which is configured to perform the method steps of the method aspects of the invention.

According to an embodiment of another aspect of the invention, a node of a distributed network is provided which is configured to perform and/or to participate in corresponding method steps of the method aspects of the invention.

According to an embodiment of another aspect of the invention, a computer program product for operating a distributed network is provided. The computer program product comprises a computer readable storage medium having program instructions embodied therewith, the program instructions executable by one or more of a plurality of nodes of the distributed network to cause the one or more of the plurality of nodes to perform steps of the method aspects of the invention.

According to an embodiment of another aspect of the invention, a computer program product for operating a node of a distributed network is provided.

According to an embodiment of another aspect of the invention, a software architecture encoded on a non-transitory computer readable medium is provided. The software architecture is configured to operate one or more nodes of a distributed network. The encoded software architecture comprises program instructions executable by one or more of the plurality of nodes to cause the one or more of the plurality of nodes to perform a method comprising steps of the method aspects of the invention.

Features and advantages of one aspect of the invention may be applied to the other aspects of the invention as appropriate.

Other advantageous embodiments are listed in the dependent claims as well as in the description below.

BRIEF DESCRIPTION OF THE DRAWINGS

The invention will be better understood and objects other than those set forth above will become apparent from the following detailed description thereof. Such description makes reference to the annexed drawings, wherein.

MODES FOR CARRYING OUT THE INVENTION

At first, some general aspects and terms of embodiments of the invention will be introduced.

According to embodiments, a distributed network comprises a plurality of nodes that are arranged in a distributed fashion. In such a distributed network computing, software and data is distributed across the plurality of nodes. The nodes establish computing resources and the distributed network may use in particular distributed computing techniques.

According to embodiments, distributed networks may be in particular embodied as blockchain networks. The term "blockchain" shall include all forms of electronic, computer-based, distributed ledgers. According to some embodiments, the blockchain network may be embodied as proof-of-work blockchain network. According to other embodiments, the blockchain network may be embodied as proof-of-stake blockchain network.

A computational unit may be defined as a piece of software that is running on a node of the distributed network and which has its own unit state. The unit state may also be denoted as execution state.

Each of the subnets is configured to replicate the set of computational units, in particular the states of the computational units, across the subnet. As a result, the computational units of a respective subnet traverse always the same chain of unit states/execution states, provided they behave honestly. A computational unit comprises the code of the computational unit and the unit state/execution state of the computational unit.

An artefact may be any information that is exchanged between the nodes of a subnet.

A replica is formed by a set of computational units that runs on a node and are assigned to the same subnet.

A messaging protocol may be defined as a protocol that manages the exchange of messages within the network, in particular of unit-to-unit messages. In particular, the messaging protocol may be configured to route the unit-to-unit messages from a sending subnet to a receiving subnet. For this, the messaging protocol uses the respective subnet-assignment. The subnet-assignment indicates to the messaging protocol the respective location/subnet of the computational units of the respective communication.

According to embodiments, a unit state shall be understood as all the data or information that is used by the computational unit, in particular the data that the computational unit stores in variables, but also data the computational units get from remote calls. The unit state may represent in particular storage locations in the respective memory locations of the respective node. The contents of these memory locations, at any given point in the execution of the computational units, is called the unit state according to embodiments. The computational units may be in particular embodied as stateful computational units, i.e. the computational units are designed according to embodiments to remember preceding events or user interactions.

Figure 1:
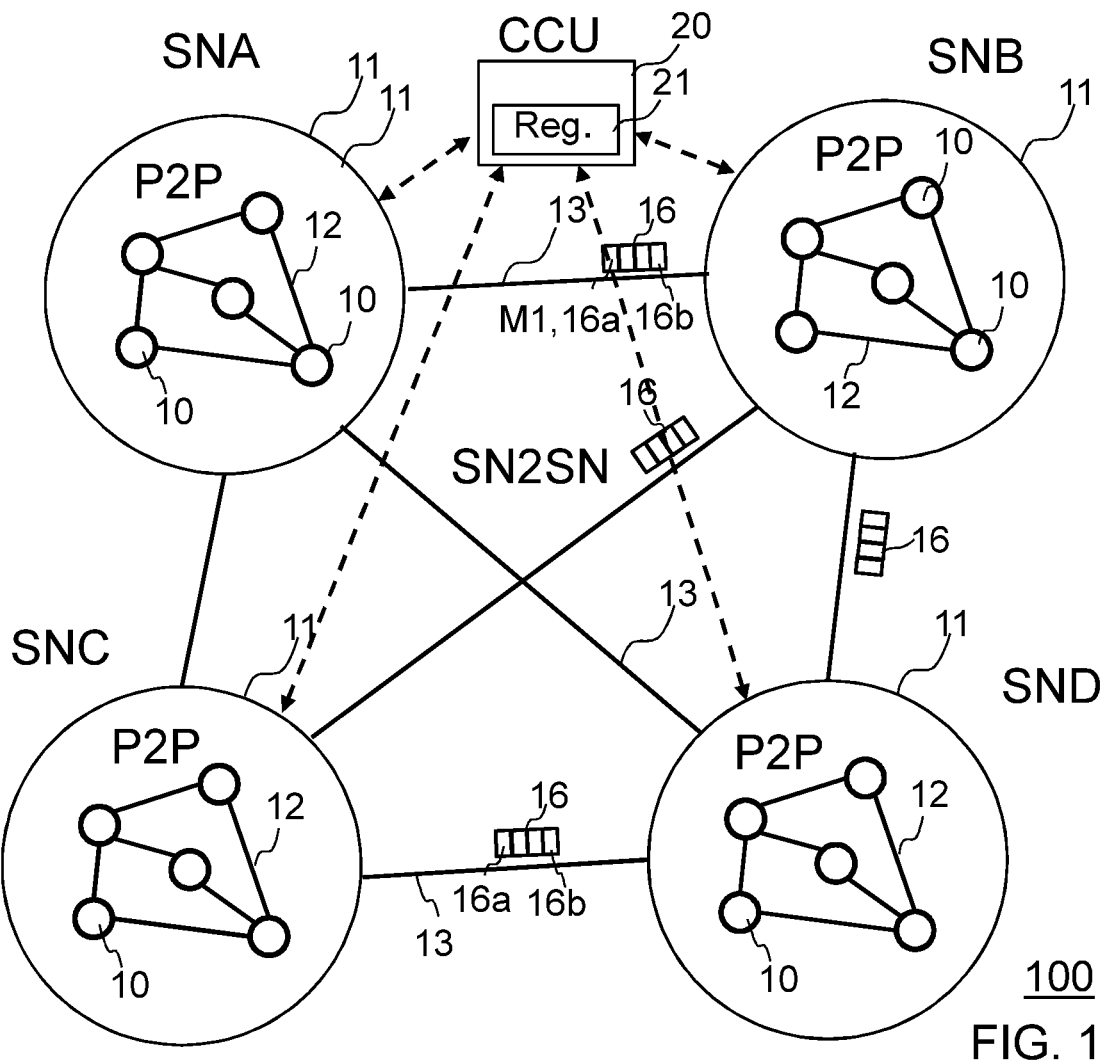
FIG. 1 shows an exemplary block diagram of a distributed network according to an embodiment of the invention.

FIG. 1 shows an exemplary block diagram of a distributed network 100 according to an embodiment of the invention.

The distributed network 100 comprises a plurality of nodes 10, which may also be denoted as network nodes 10. The plurality of nodes 10 are distributed over a plurality of subnets 11. In the example of FIG. 1, four subnets 11 denoted with SNA, SNB, SNC and SND are provided.

Each of the plurality of subnets 11 is configured to run a set of computational units on each node 10 of the respective subnet 11. According to embodiments a computational unit shall be understood as a piece of software, in particular as a piece of software that comprises or has its own unit state or in other words execution state.

The network 100 comprises communication links 12 for intra-subnet communication within the respective subnet 11, in particular for intra-subnet unit-to-unit messages to be exchanged between computational units assigned to the same subnet and for intra-subnet messages comprising replica-local data for reporting.

Furthermore, the network 100 comprises communication links 13 for inter-subnet communication between different ones of the subnets 11, in particular for inter-subnet unit-to-unit messages to be exchanged between computational units assigned to different subnets.

Accordingly, the communication links 12 may also be denoted as intra-subnet or Peer-to-Peer (P2P) communications links and the communication links 13 may also be denoted as inter-subnet or Subnet-to-Subnet (SN2SN) communications links.

According to embodiments of the invention the subnets 11 are configured to replicate the set of computational units across the respective subnet 11. More particularly, the subnets 11 are configured to replicate the unit state of the computational units across the respective subnet 11. The set of computational units of a subnet that runs on a node forms a replica of the subnet.

The network 100 may be in particular a proof-of-stake blockchain network.

Proof-of-stake (PoS) describes a method by which a blockchain network reaches distributed consensus about which node is allowed to create the next block of the blockchain. PoS-methods may use a weighted random selection, whereby the weights of the individual nodes may be determined in particular in dependence on the assets (the "stake") of the respective node.

Figure 2:
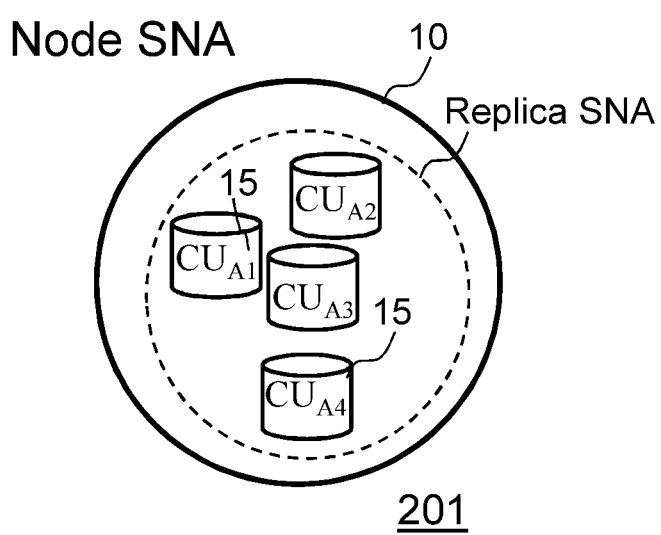
FIG. 2 illustrates in a more detailed way computational units running on a node of the network and forming a replica of a subnet.

FIG. 2 illustrates in a more detailed way computational units 15 running on nodes 10 of the network 100. The network 100 is configured to assign each of the computational units which are running on the network 100 to one of the plurality of subnets, in this example to one of the subnets SNA, SNB, SNC or SND according to a subnet-assignment. The subnet-assignment of the distributed network 100 creates an assigned subset of the whole set of computational units for each of the subnets SNA, SNB, SNC and SND.

More particularly, FIG. 2 shows a node 10 of the subnet SNA of FIG. 1. The subnet assignment of the distributed network 100 has assigned a subset of four computational units 15 to the subnet SNA more particularly the subset of computational units $CU_{A1}$, $CU_{A2}$, $CU_{A3}$ and $CU_{A4}$. The assigned subset of computational units $CU_{A1}$, $CU_{A2}$, $CU_{A3}$ and $CU_{A4}$ runs on each node 10 of the subnet SNA. Furthermore, the assigned subset of computational units $CU_{A1}$, $CU_{A2}$, $CU_{A3}$ and $CU_{A4}$ is replicated across the whole subnet SNA such that each of the computational units $CU_{A1}$, $CU_{A2}$, $CU_{A3}$ and $CU_{A4}$ traverses the same chain of unit states and forms on each node 10 of the subnet a replica of the subnet. This may be implemented in particular by performing an active replication in space of the unit state of the computational units $CU_{A1}$, $CU_{A2}$, $CU_{A3}$ and $CU_{A4}$ on each of the nodes 10 of the subnet SNA. The computational units $CU_{A1}$, $CU_{A2}$, $CU_{A3}$ and $CU_{A4}$ are embodied as user computational units. In addition, a subnet may also comprise system computational units which are not shown in FIG. 2.

As shown in FIG. 1, the distributed network 100 comprises a central control unit CCU, 20. The central control unit 20 may comprise a central registry 21 to provide network control information to the nodes of the network.

According to embodiments, the distributed network may be in particular configured to exchange inter-subnet messages 16 between the subnets SNA, SNB, SNC and SND via a messaging protocol. The inter-subnet messages 16 may be in particular embodied as inter-subnet unit-to-unit messages 16a to be exchanged between computational units that have been assigned to different subnets according to the subnet-assignment. As an example, the distributed network 100 may be configured to exchange a unit-to-unit message M1, 16a between the computational unit $CU_{A1}$ as sending computational unit running on the subnet SNA and the computational unit $CU_{B2}$ as receiving computational unit running on the subnet SNB. In addition, the inter-subnet messages 16 may be embodied as signalling messages 16b. The signalling messages 16b may encompass acknowledgement messages (ACK) adapted to acknowledge an acceptance or receipt of the unit-to-unit messages or non-acknowledgement messages (NACK) adapted to not-acknowledge an acceptance (corresponding to a rejection) of the unit-to-unit messages, e.g. to indicate a transmission failure.

The network 100 may be in particular configured to store the subnet-assignment of the computational units 10 as network configuration data. This information may also be stored in the central registry.

According to further embodiments, the network 100 may be configured to exchange the inter-subnet messages 16 via a messaging protocol and a consensus protocol. The consensus protocol may be configured to reach a consensus on the selection and/or processing order of the inter-subnet messages 16 at the respective receiving subnet.

Referring e.g. to the subnet SNB, it receives inter-subnet messages 16 from the subnets SNA, SNC and SND. The consensus protocol receives and processes these inter-subnet messages 16 and performs a predefined consensus algorithm or consensus mechanism to reach a consensus on the selection and/or processing order of the received inter-subnet messages 16.

Figure 3:
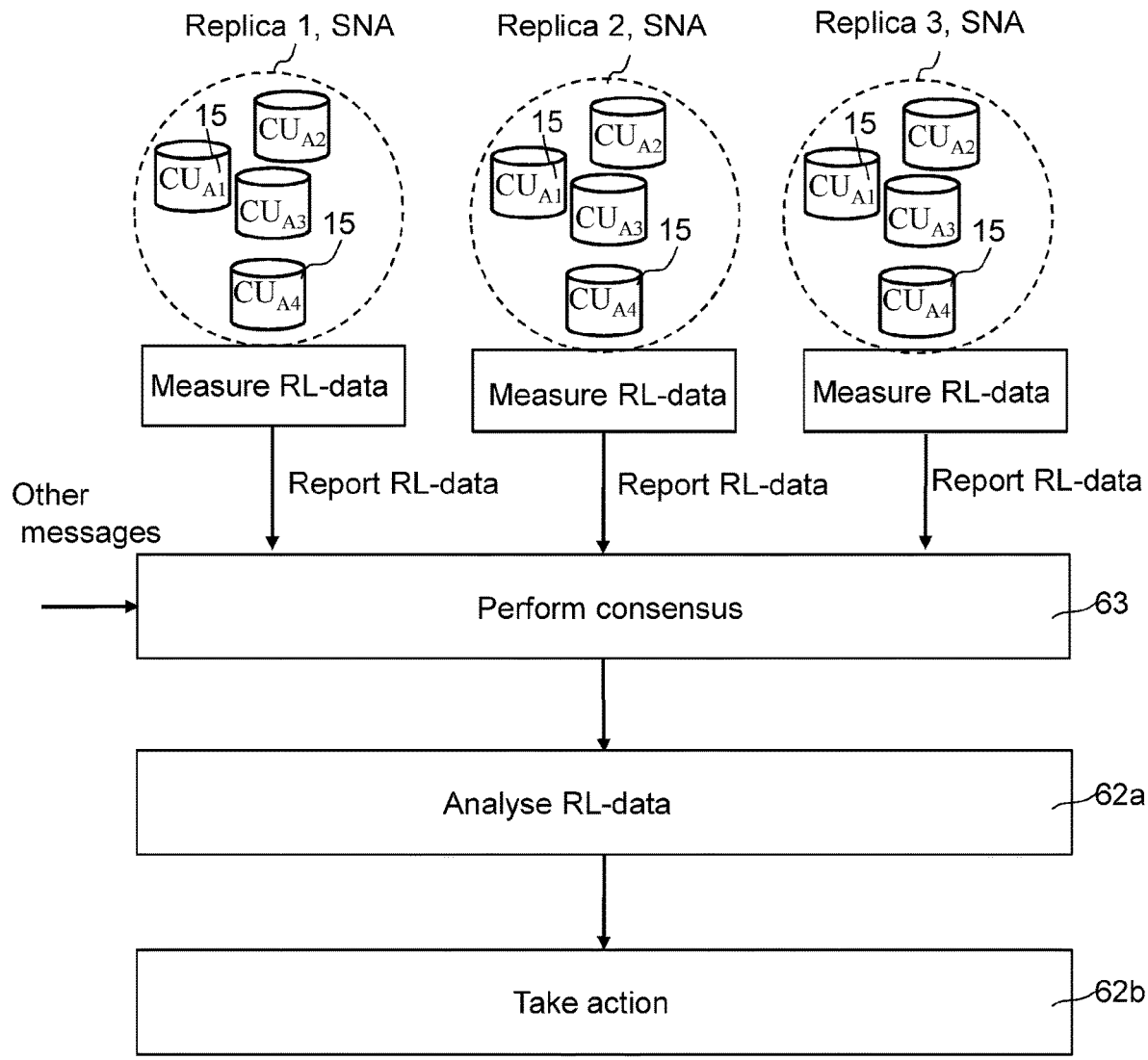
FIG. 3 illustrates steps of a computer-implemented method according to an embodiment of the invention.

Referring now to FIG. 3, a computer-implemented method for operating a distributed network according to embodiments of the invention will be explained.

According to this embodiment it is assumed that the subnet SNA comprises three nodes. On each of the three nodes there are run replicas 1, 2 and 3 respectively, wherein each of the replicas 1, 2 and 3 comprises the set of computational units $CU_{A1}$, $CU_{A2}$, $CU_{A3}$ and $CU_{A4}$. Each of the replicas 1, 2 and 3 measures during its operation replica-local data and reports this replica-local data to a consensus component 63. The consensus component 63 is configured to reach a consensus on input blocks which are later on to be processed by the replicas 1, 2 and 3 of the subnet SNA. Apart from the replica-local data the consensus component 63 may receive e.g. messages from users or other subnets which will be explained in more detail further below. The subnet SNA utilizes then the replica-local data for an analysis of the computations which have been executed by the computational units $CU_{A1}$, $CU_{A2}$, $CU_{A3}$ and $CU_{A4}$ across the subnet. The analysis may be done by a statistical analysis component 62a. Then the subnet may perform or initiate one or more actions based on the analysis. The actions may be performed on a replica level or on a subnet level. The actions may be initiated by an action component 62b.

Figure 4:
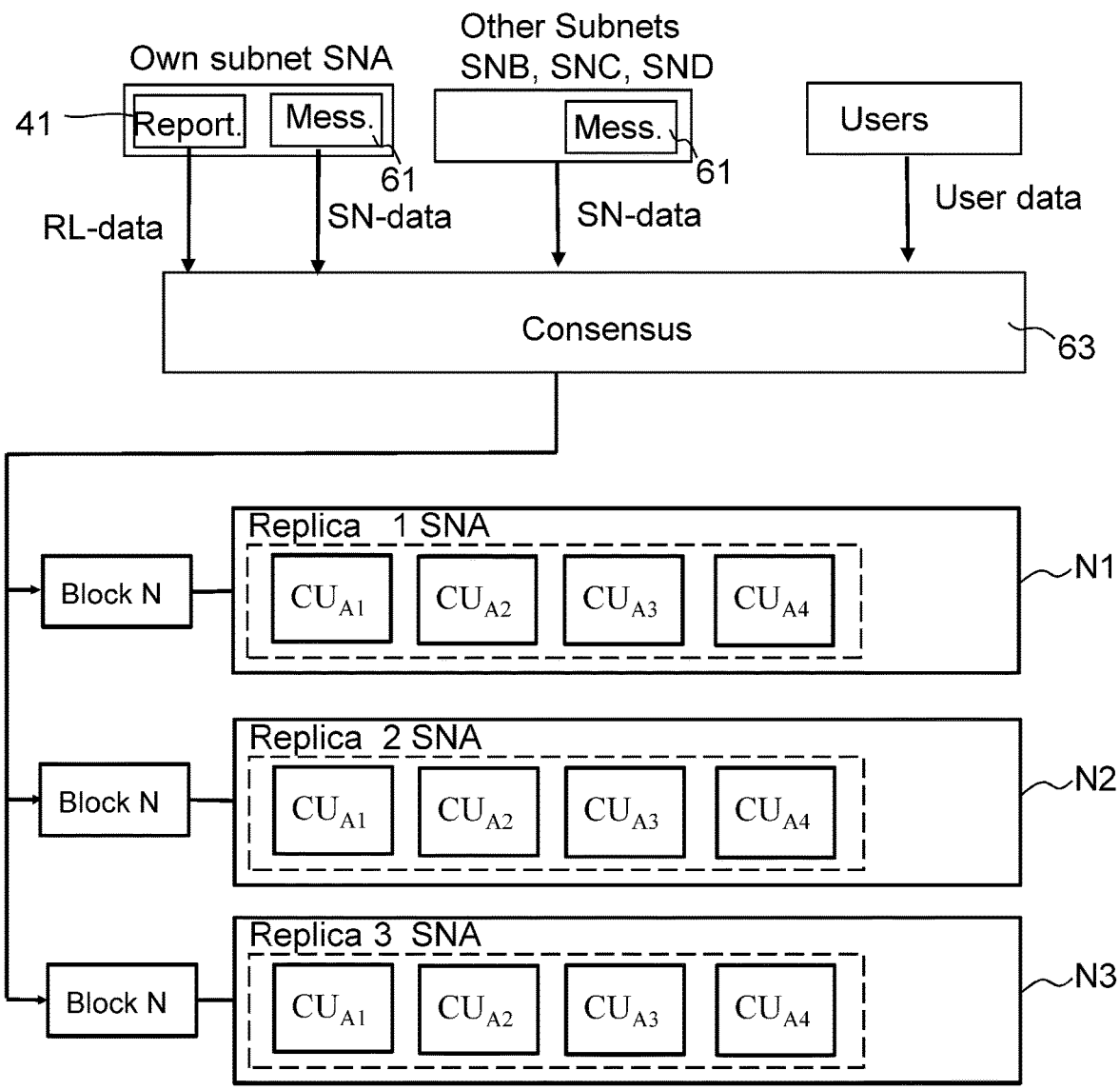
FIG. 4 illustrates a message/data flow in a distributed network according to an embodiment of the invention.

Referring now to FIG. 4, a message/data flow in a distributed network according to an embodiment of the invention is illustrated. More particularly, FIG. 4 illustrates how input blocks are created which are then processed by the replicas of a subnet.

The illustration is again done with respect to the subnet SNA which comprises the three replicas 1, 2 and 3 on which the 4 computational units $CU_{A1}$, $CU_{A2}$, $CU_{A3}$ and $CU_{A4}$ are run.

Each of the replicas 1, 2 and 3 execute the same sequence of input blocks. The input blocks are created by the consensus component 63. The consensus component 63 receives a plurality of input data from a plurality of sources.

At first, the consensus component 63 receives data from its own subnet SNA. The own subnet SNA comprises a reporting component 41 and a messaging component 61. The reporting component 41 reports the replica-local data which has been measured by the respective replicas 1, 2 or 3 of the subnet SNA to the consensus component 63. In addition, the messaging component 61 of the subnet SNA provides intra-subnet messages denoted as SN-data sent by one of the computational units $CU_{A1}$, $CU_{A2}$, $CU_{A3}$ or $CU_{A4}$ to one of the other computational unit $CU_{A1}$, $CU_{A2}$, $CU_{A3}$ or $CU_{A4}$.

It should be noted that the reporting component 41 is per replica, whereas the messaging component 61 is per subnet, at least logically. While the messaging component 61 is deterministic, the reporting component 41 may produce different output on each replica.

Furthermore, the consensus component 63 receives further SN-data from messaging components 61 of the other subnets SNB, SNC and SND.

In addition, the consensus component 63 receives user data from users of the distributed network. Such incoming user data may also be denoted as ingress messages.

Figure 5:
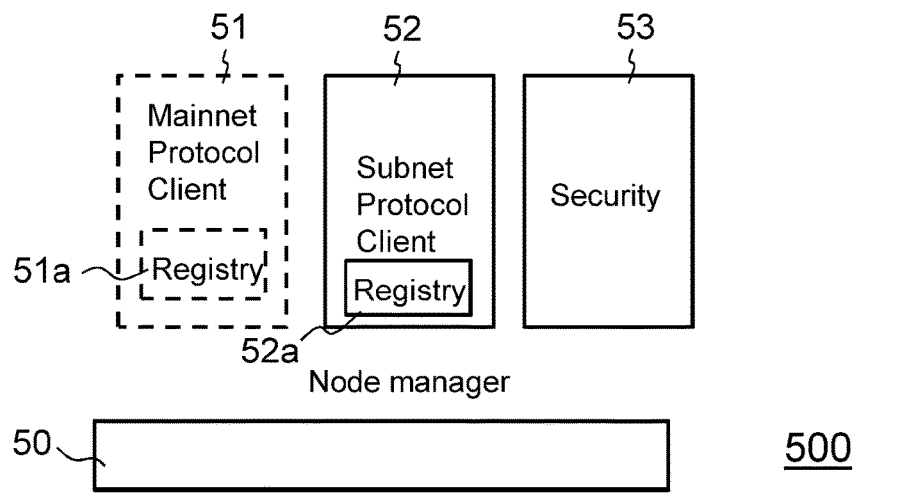
FIG. 5 illustrates main processes which are run on each node of the network according to an embodiment of the invention.

FIG. 5 illustrates main processes which may be run on each node 10 of the network 100 according to an embodiment of the invention. A network client of networks according to embodiments of the invention is the set of protocol components that are necessary for a node 10 to participate in the network. According to embodiments, each node 10 is a member of a mainnet. Furthermore, each node may be a member of one or more subnets.

A node manager 50 is configured to start, re-start and update a mainnet protocol client 51, a subnet protocol client 52 and a security application 53. According to other embodiments, the central control unit 20 may be used instead of the mainnet protocol client (see FIG. 1). According to embodiments several subnet protocol clients may be used, thereby implementing several replicas.

According to embodiments, each of the plurality of subnets 11 is configured to run a separate subnet protocol client 52 on its corresponding nodes 10. The mainnet protocol client 51 is in particular configured to distribute configuration data to and between the plurality of subnets 11. The mainnet protocol client 51 may be in particular configured to run only system computational units, but not any user-provided computational units. The mainnet protocol client 51 is the local client of the mainnet and the subnet protocol client 52 is the local client of the subnet. The subnet protocol client 52 comprises a registry 52a and the mainnet protocol client a registry 51a.

The security application 53 stores secret keys of the nodes 10 and performs corresponding operations with them.

The node manager 50 may monitor e.g. the registry 21 of the control unit 20, it may instruct the nodes to participate in a subnet, and/or it may instruct the nodes to stop participation in a subnet.

Figure 6:
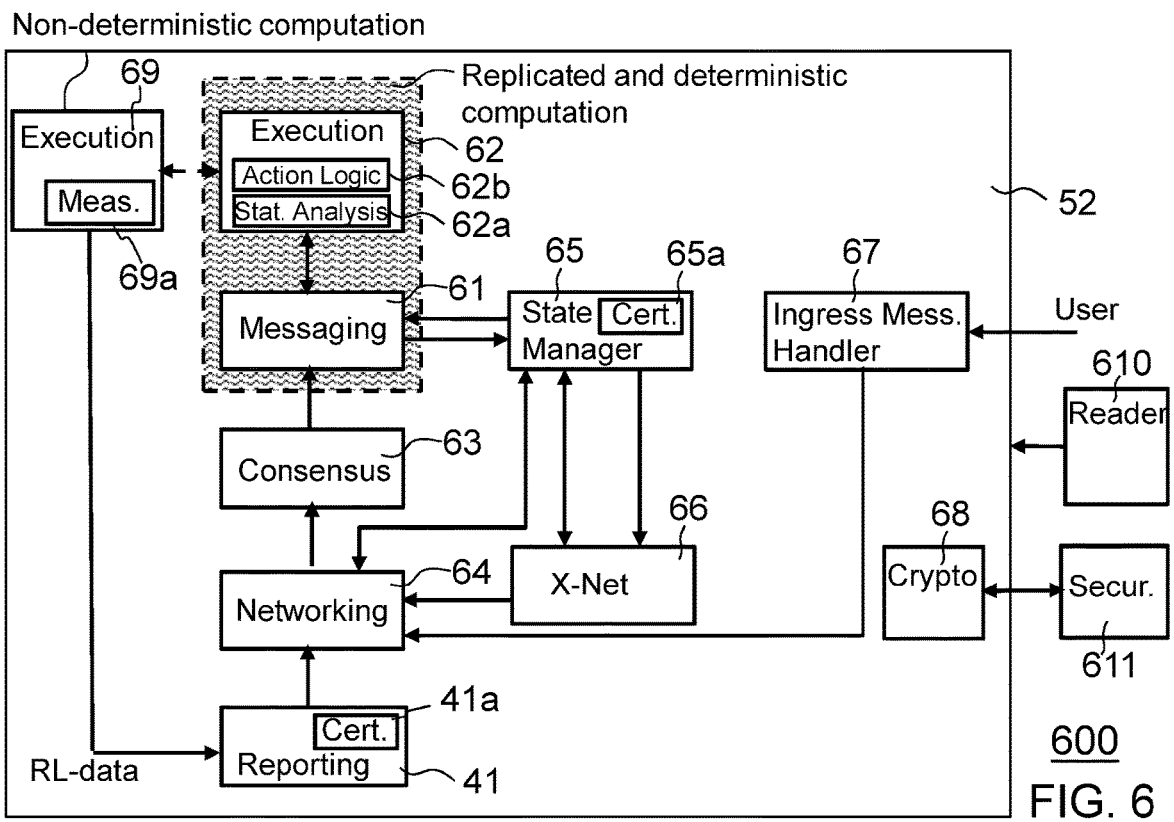
FIG. 6 shows a schematic block diagram of protocol components of a subnet protocol client.

FIG. 6 shows a schematic block diagram of protocol components 600 of a subnet protocol client, e.g. of the subnet protocol client 52 of FIG. 5.

The protocol components 600 comprise a messaging component 61 which is configured to run a messaging protocol and an execution component 62 configured to run an execution protocol for executing execution messages, in particular for executing unit-to-unit messages and/or ingress messages. The protocol components 600 further comprise a consensus component 63 configured to run a consensus protocol, a networking component 64 configured to run a networking protocol, a state manager component 65 configured to run a state manager protocol, an X-Net component 66 configured to run a cross-subnet transfer protocol and an ingress message handler component 67 configured to handle ingress message received from an external user of the network. The protocol components 600 comprise in addition a crypto-component 68. The crypto-component 68 co-operates with a security component 611, which may be e.g. embodied as the security application 53 as described with reference to FIG. 5. Furthermore, the subnet-protocol client 52 may cooperate with a reader component 610, which may be a part of the mainnet protocol client 51 as described with reference to FIG. 5. The reader component 610 may provide information that is stored and distributed by the mainnet to the respective subnet protocol client 52. This includes the assignment of nodes to subnets, node public keys, assignment of computational units to subnets etc.

The messaging component 61 and the execution component 62 are configured such that all computation, data and state in these components is identically replicated across all nodes of the respective subnet, more particularly all honest nodes of the respective subnet. This is indicated by the wave-pattern background of these components.

Such an identical replication is achieved according to embodiments on the one hand by virtue of the consensus component 63 that ensures that the stream of inputs to the messaging component 61 is agreed upon by the respective subnet and thus identical for all nodes, more particularly by all honest nodes. On the other hand, this is achieved by the fact that the messaging component 61 and the execution component 62 are configured to perform a deterministic and replicated computation.

The X-Net Transfer component 66 sends message streams to other subnets and receives message streams from other subnets.

Most components may access the crypto component 68 to execute cryptographic algorithms and the mainnet reader 70 for reading configuration information.

The execution component 62 receives from the messaging component 61 a unit state of the computational unit and an incoming message for the computational unit, and returns an outgoing message and the updated unit state of the computational unit. While performing the execution, it may also measure a resource consumption (gas consumption) of the processed message (query).

The messaging component 61 is clocked by the input blocks received from the consensus component 63. That is, for each input block, the messaging component 61 performs steps as follows. It parses the respective input blocks to obtain the messages for its computational units. Furthermore, it routes the messages to the respective input queues of the different computational units and schedules messages to be executed according to the capacity each computational unit got assigned. Then it uses the execution component 62 to process a message by the corresponding computational unit, resulting in messages to be sent being added to an output queue of the respective computational unit. However, when the message is destined to a computational unit on the same subnet it may be put directly in the input queue of the corresponding computational unit. The messaging component 61 finally routes the messages of the output queues of the computational units into message streams for subnets on which the receiving computational units are located and forwards these message streams to the state manager component 65 to be certified, i.e., signed by the respective subnet.

The state manager component 65 comprises a certification component 65a. The certification component 65a is configured to certify the output streams of the respective subnet. This may be performed e.g. by a threshold-signature, a multi-signature or a collection of individual signatures of the computational units of the respective subnet.

As mentioned the execution component 62 performs a deterministic and replicated execution of the input blocks. This execution is performed on the respective node 10 and uses resources of the node 10. However, the execution of the input blocks uses resources of the respective node, in particular physical resources such as memory, processors(s), network bandwidth etc. The use of these resources is non-deterministic and may differ between the replicas of a subnet. Accordingly, the non-deterministic part of the execution of the input blocks is represented in FIG. 6 with an execution component 69. The non-deterministic execution component 69 comprises a measurement component 69a. The measurement component 69a measures the replica-local data of the execution, in particular the non-deterministic data of the execution.

The execution component 69 sends the measured replica-local data to a reporting component 41. The reporting component 41 reports the replica-local data to the networking component 64 which forwards/routes the replica-local data to the consensus component 63.

The networking component 64 also forwards the replica-local data to the other replicas on the subnet via a broadcast protocol, e.g. a gossip protocol. Conversely, the network component 64 also accepts the replica-local data produced by the other replicas and forwards that to the consensus component 63 as well.

The reporting component 41 comprises a certification component 41a. The certification component 41a may certify the received replica-local data before forwarding it to the networking component 64. The certification component 41a may issue in particular a signature of the replica/node on the replica-local data.

The replica-local data is then processed by the consensus component 63. The consensus component 63 runs a consensus protocol and forms input blocks to be processed by the replica.

The replica-local data is then processed by the messaging component 61 which forwards/routes the replica-local data to the execution component 62.

The execution component 62 comprises as sub-components a statistical analysis component 62a and an action component 62b.

The statistical analysis component 62a is configured to perform a statistical analysis of the replica-local data.

The action component 62b is configured to take or initiate one or more actions in dependence on the analysis of the replica-local data.

Both the statistical analysis component 62a and the action component 62b are implemented as part of the respective subnet protocol client 52.

According to embodiments the statistical analysis component 62a and the action component 62b may be implemented as system computational units.

Figure 7:
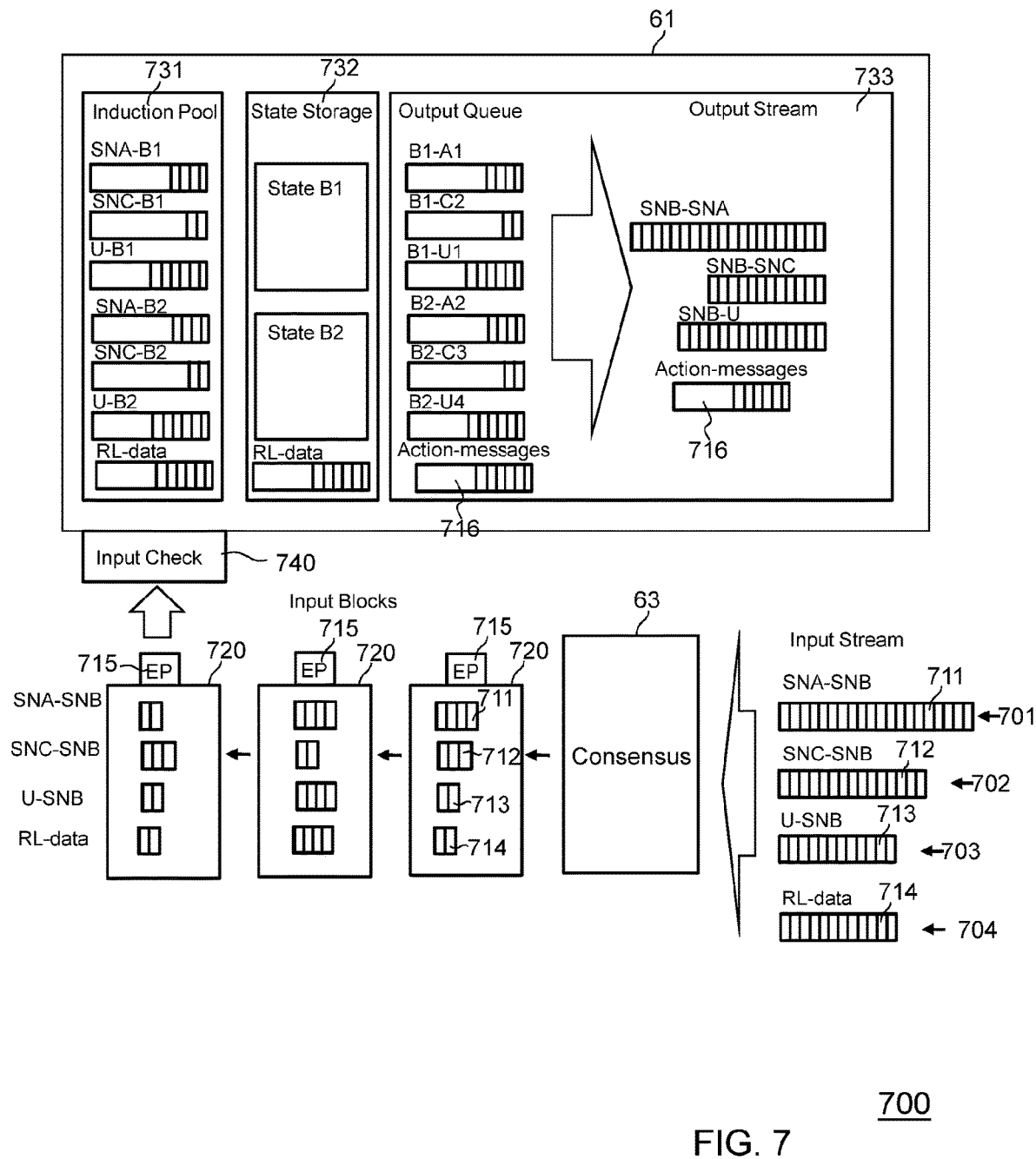
FIG. 7 shows an exemplary visualization of a workflow of a messaging protocol and a consensus protocol and the associated components.

FIG. 7 shows an exemplary visualization of a workflow 700 of the messaging protocol and the consensus protocol and the associated components, e.g. of the messaging component 61 and the consensus component 63 of FIG. 6.

More particularly, FIG. 7 visualizes the workflow of inter-subnet messages exchanged between a subnet SNB and subnets SNA and SNC. Furthermore, the subnet SNB exchanges ingress messages with a plurality of users U. Furthermore, the subnet SNB measures, reports and analyses replica-local data (RL-data).

Starting from the bottom right of FIG. 7, a plurality of input streams 701, 702, 703 and 704 is received by a consensus component 63. The consensus component 63 is a subnet consensus component that is run by a subnet client of the subnet SNB. The input stream 701 comprises inter-subnet messages 711 from the subnet SNA to the Subnet SNB. The input stream 702 comprises inter-subnet messages 712 from the subnet SNC to the Subnet SNB. The input stream 703 comprises ingress messages 713 from the plurality of users U to the subnet SNB. The input stream 704 comprises replica-local data 714 of the replicas of the subnet SNB.

The inter-subnet messages 711 and 712 comprise inter-subnet unit-to-unit messages to be exchanged between the computational units of the different subnets as well as signalling messages. The signalling messages are used to acknowledge or not acknowledge an acceptance of unit-to-unit messages. The messaging component 61 is configured to send the signalling messages from a receiving subnet to a corresponding sending subnet, i.e. in this example from the subnet SNB to the subnets SNA and SNC. The messaging component 61 is according to this example configured to store the sent inter-subnet unit-to-unit messages until an acknowledgement message has been received for the respective unit-to-unit message. This provides a guaranteed delivery.

The consensus component 63 is configured to receive and process the inter-subnet messages 711, 712 of the subnets SNA, SNC, the ingress messages 713 of the users U and the replica-local data 714 of the replicas from SNB and to generate a queue of input blocks 720 from the inter-subnet messages 711, 712, the ingress messages 713 and the replica-local data 714 according to a predefined consensus mechanism that is executed by the corresponding consensus protocol. Each input block 720 produced by consensus contains a set of ingress messages 713, a set of inter-subnet messages 711, 712, replica-local data 714 and execution parameters 715, EP. The execution parameters 715, EP may include in particular a random seed, a designated execution time and/or a height index. The consensus component 63 may also vary the number of messages in every input block based on the current load of the subnet.

The consensus component 63 provides the queue of input blocks 720 then to the messaging component 61 which is configured to execute the messaging protocol and to process the input blocks 720.

The messaging protocol and the messaging component 61 are clocked by the input blocks 720 received from the consensus component 63.

Before processing the received input blocks, the messaging component 61 may perform one or more pre-processing steps including one or more input checks. The input checks may be performed by an input check component 740.

If the input checks have been passed successfully, the messages of the respective input block 720 may be further processed by the messaging component 61 and the corresponding messages may be appended to a corresponding queue in an induction pool of an induction pool component 731. The induction pool component 731 of the messaging component 61 receives input blocks and input messages that have been successfully passed the input check component 740 and have accordingly been accepted by the messaging component 61 for further processing.

In general, the messaging component 61 pre-processes the input blocks 720 by placing ingress messages, signalling messages, inter-subnet messages and replica-local data into the induction pool component 731 as appropriate. Signalling messages in the subnet streams are treated as acknowledgements of messages of the output queues which can be purged.

In this example, the induction pool component 731 comprises subnet-to-unit queues SNA-B1, SNC-B1, SNA-B2 and SNC-B2 as well as user-to-unit queues U-B1 and U-B2 and the replica-local data for the statistical analysis component 62a and the action component 62b.

Following these pre-processing steps, the messaging component 61 invokes the execution component 62 (see FIG. 6) to execute as much of the induction pool as is feasible during a single execution cycle, providing the designated execution time and the random seed as additional inputs. Following the execution cycle, a resulting output queue of messages, which may also be denoted as output messages, is fed to an output queue component 733. Initially the output queue component 733 comprises unit-to-unit and unit-to-user output queues, in this example the unit-to-unit output queues B1-A1, B1-C2, B2-A2 and B2-C3 and the unit-to-user output queues B1-U1 and B2-U4. As an example, the messages B1-A1 denote output messages from the computational unit B1 of subnet SNB to the computational unit A1 of subnet SNA. As another example, the messages B1-U1 denote output messages from the computational unit B1 of subnet SNB to the user U1. Furthermore, the output queue comprises action messages 716 comprising actions that have been taken by the action component 62b. The action messages are addressed to the registries 52a of the subnet protocol client or to a separate system computational unit.

The output queue component 733 post-processes the resulting output queue of the output messages by forming a set of per-subnet output streams to be certified, e.g. by the certification component 65a as shown in FIG. 6, and disseminated by other components. In this example, the per-subnet output streams SNB-SNA, SNB-SNC and SNB-U are provided.

Hence the messaging component 61 further comprises a state storage component 732 that is configured to store the state/unit state of the computational units of the respective subnet, in this example the states of the computational units B1 and B2 of the subnet SNB. The corresponding unit state is the working memory of each computational unit.

The messaging component 61 revolves around mutating certain pieces of system state deterministically. In each round, the execution component 61 will execute certain messages from the induction pool by reading and updating the state of the respective computational unit and return any outgoing messages the executed computational unit wants to send. These outgoing messages or in other words output messages go into the output queue component 733, which initially contains unit-to unit messages between computational units of the network. While intra-subnet messages between computational units of the same subnet may be routed and distributed internally within the respective subnet, inter-subnet messages are routed into output streams sorted by subnet-destinations.

In addition, two pieces of state may be maintained according to embodiments to inform the rest of the system about which messages have been processed. A first piece may be maintained for inter-subnet messages and a second piece of state for ingress messages.

In the following the interactions between the mainnet protocol clients 51 and the subnet protocol clients 52 is described in more detail (see FIG. 5). The mainnet protocol clients 51 manages a number of registries that contain configuration information for the subnets. These registries are implemented by computational units on the mainnet. As mentioned according to other embodiments the central registry may be used instead of the mainnet. Furthermore, each of the subnet protocol clients 52 maintains a registry 52a. This registry 52a comprises control and/or system information for locally managing the subnet operation. This may be in particular used to allocate the resources of the replica/node to the individual computational units. As an example, the registry 52a may specify a maximum logical time allocated to the computational units of the replica. In this respect the action messages could comprise e.g. an instruction to the registry 52a that the logical time allocated to a misbehaving computational unit of the subnet shall be reduced.

This may in particular also be used to ban a misbehaving replica. As an example, the registry 52a may specify a list of replicas that are assigned to the subnet. In this respect the action messages could comprise e.g. an instruction to the registry 52a that the misbehaving replica is removed or replaced.

Figure 8:
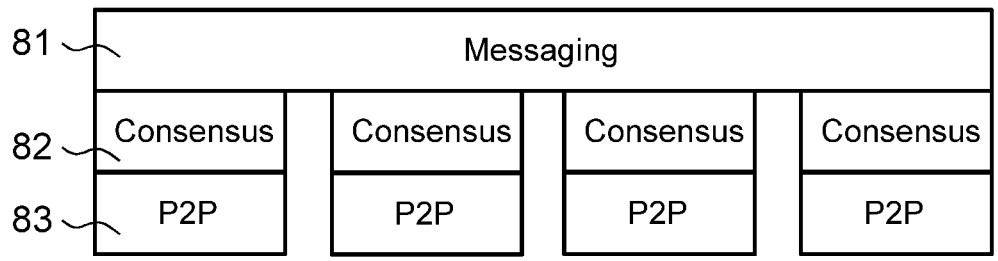
FIG. 8 shows a layer model illustrating main layers which are involved in the exchange of inter-subnet and intra-subnet messages.

FIG. 8 shows a layer model 800 illustrating main layers which are involved in the exchange of inter-subnet and intra-subnet messages. The layer model 800 comprises a messaging layer 81 which is configured to serve as an upper layer for the inter-subnet communication. More particularly, the messaging layer 81 is configured to route inter subnet messages between computational units of different subnets. Furthermore, the messaging layer 81 is configured to route ingress messages from users of the network to computational units of the network.

The layer model 800 further comprises a plurality of consensus layers 82 which are configured to receive inter-subnet messages from different subnets as well as ingress messages and to organize them, in particular by agreeing on a processing order, in a sequence of input blocks which are then further processed by the respective subnet. In addition, the layer model 800 comprises a peer-to-peer (P2P) layer that is configured to organize and drive communication between the nodes of a single subnet.

According to embodiments, the network may comprise a plurality of further layers, in particular an execution layer which is configured to execute execution messages on the computational units of the network.

Figure 9:
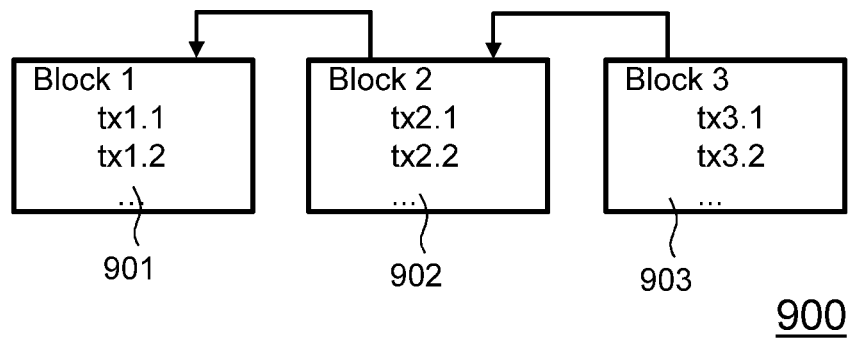
FIG. 9 illustrates the creation of input blocks by a consensus component according to an exemplary embodiment of the invention.

Referring now to FIG. 9, the creation of blocks in distributed networks according to embodiments of the invention is illustrated. The blocks may be in particular the input blocks 720 shown in FIG. 7 which are created by the consensus component 63 that runs the consensus protocol, in particular a local subnet consensus protocol.

In this exemplary embodiment three input blocks 901, 902 and 903 are illustrated. Block 901 comprises a plurality of transactions, namely the transactions tx1.1, tx1.2 and possibly further transactions indicated with dots. Block 902 comprises also a plurality of transactions, namely the transactions tx2.1, tx2.2 and possibly further transactions indicated with dots. Block 903 also comprises a plurality of transactions, namely the transactions tx3.1, tx3.2 and possibly further transactions indicated with dots. The input blocks 901, 902 and 903 are chained together. More particularly, each of the blocks comprises a block hash of the previous block. This cryptographically ties the current block to the previous block(s).

According to embodiments the transactions may be inter-subnet messages, ingress messages and signalling messages.

According to embodiments, the input blocks 901, 902 and 903 may be created by a proof-of-stake consensus-protocol.

However, it should be noted that the input blocks generated by the consensus component do not need to be chained together according to embodiments. Rather any consensus protocol that reaches some kind of consensus between the nodes of a subnet on the processing order of received messages may be used according to embodiments.

Figure 10:
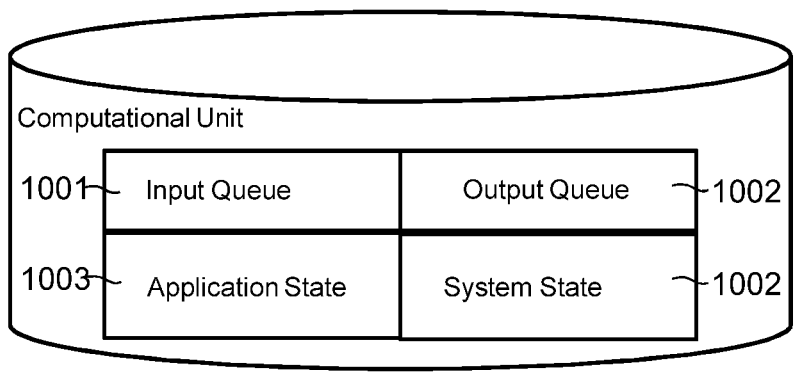
FIG. 10 shows a more detailed illustration of a computational unit.

FIG. 10 shows a more detailed illustration of a computational unit 1000 according to an embodiment of the invention.

The computational unit 1000 comprises an input queue 1001, an output queue 1002, an application state 1003 and a system state 1004.

The computational unit 1000 generally comprises the code of the computational unit and the unit state/execution state of the computational unit.

Figure 11:
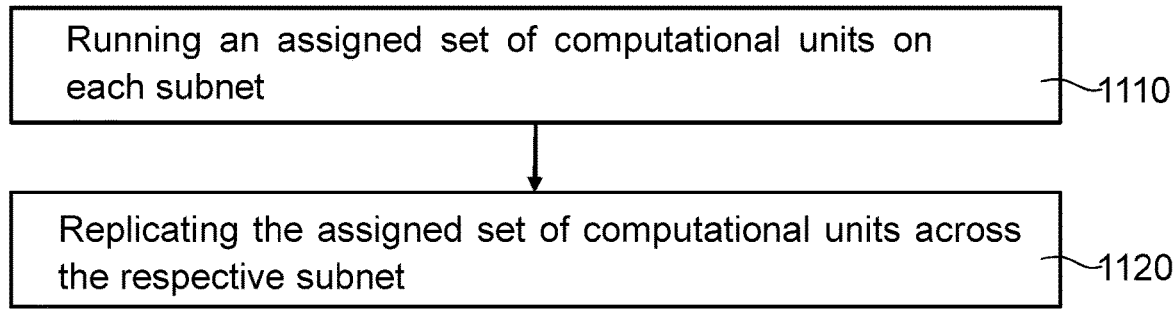
FIG. 11 shows a flow chart comprising method steps of a computer-implemented method for running a distributed network.

FIG. 11 shows a flow chart 1100 comprising method steps of a computer-implemented method for running a distributed network comprising a plurality of subnets according to embodiments of the invention. The distributed network may be e.g. embodied as the network 100 as shown in FIG. 1.

At a step 1110, each subnet of the plurality of subnets runs a set of computational units on its nodes, wherein each of the computational units comprises its own unit state.

At a step 1120, the network replicates the set of computational units across the respective subnet.

Figure 12:
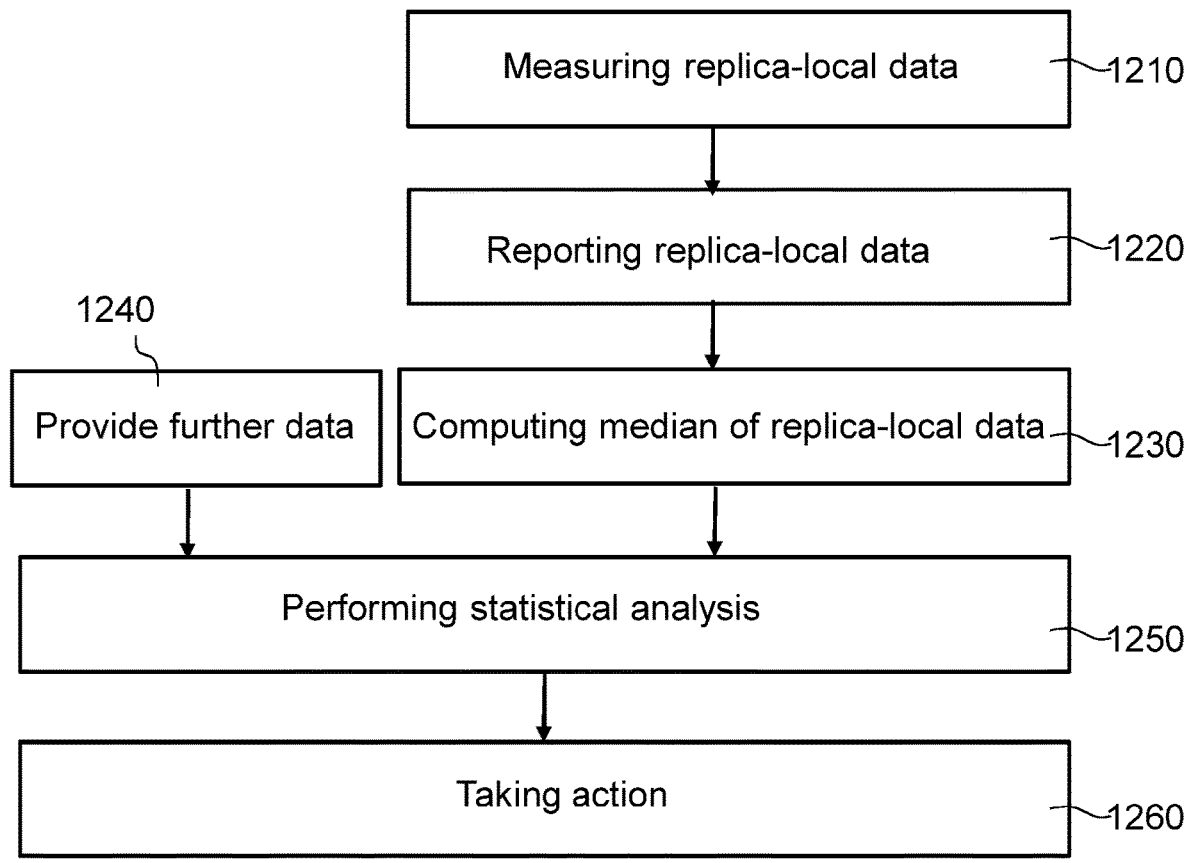
FIG. 12 shows a flow chart comprising further method steps of a computer-implemented method for operating a distributed network.

FIG. 12 shows a flow chart 1200 comprising method steps of a computer-implemented method according to an embodiment of the invention. The distributed network may be e.g. embodied as the network 100 as shown in FIG. 1.

At a step 1210, the replicas/nodes of a subnet measure replica-local data of the respective replica.

At a step 1220, the replicas/nodes report the replica-local data to a consensus component, e.g. to the consensus component 63 as described above.

In one or more following steps, following consensus, the replica-local data is utilized for an analysis of the computations executed across the respective subnet.

More particularly, at a step 1230, the respective subnet computes a set of median values of the replica-local data across the subnet.

As an example, assuming a subnet has e.g. 30 replicas and each of the 30 replicas has 100 computational units. Further assuming that each of the replicas measures 2 replica local values for each of the 100 computational units as replica-local data, e.g. the number of cache misses and the ratio of wall clock time to logical time of the executions done by the respective computational unit. Then, the subnet computes two sets of median values, namely for each of the 100 computational units a median value for the number of cache misses and a median value for the ratio of wall clock time to logical time. As a result, in this example the subnet has computed two sets of median values, each set comprising 100 median values.

As a second example, assuming a subnet has e.g. 30 replicas. Further assuming that each replica maintains a direct communication link with 10 other replicas from the subnet, thereby forming an overlay topology. Further assuming that each of the replicas measures one replica local value for each of the 10 other replicas that it communicates with as replica-local data, e.g. the average download speed at which the protocol artifacts are received from the other replica. Then the subnet computes one set of median values, namely for each of the 30 replicas a median value for the download speed provided by that replica. As a result, in this example the subnet has computed one set of median values, the set comprising 30 median values, each median value calculated from 10 reported values.

As a third example, assuming a subnet has e.g. 30 replicas. Further assuming that each of the replicas measures one replica local value for each of the 29 other replicas as replica-local data, e.g. the number of times that the replica observed, within a defined time window, a signature share from the other replica for a threshold signature that was to be created by the subnet. Then the subnet computes one set of median values, namely for each of the 30 replicas a median value for the number of observed signature shares. As a result, in this example the subnet has computed one set of median values, the set comprising 30 median values, each median value calculated from 29 reported values.

Furthermore, at a step 1240, further data, in particular publicly verifiable data such as blockchain data, may be provided.

Then, at a step 1250, the subnet performs an analysis, more particularly a statistical analysis of the set of median values and the further data. The statistical analysis may be used e.g. to identify computational units that produce significantly more cache misses than the other computational units.

Next, at a step 1260, the subnet takes one or more actions in dependence on the statistical analysis.

As an example, the logical time allocated to computational units which produce a lot of cache misses may be reduced.

Figure 13:
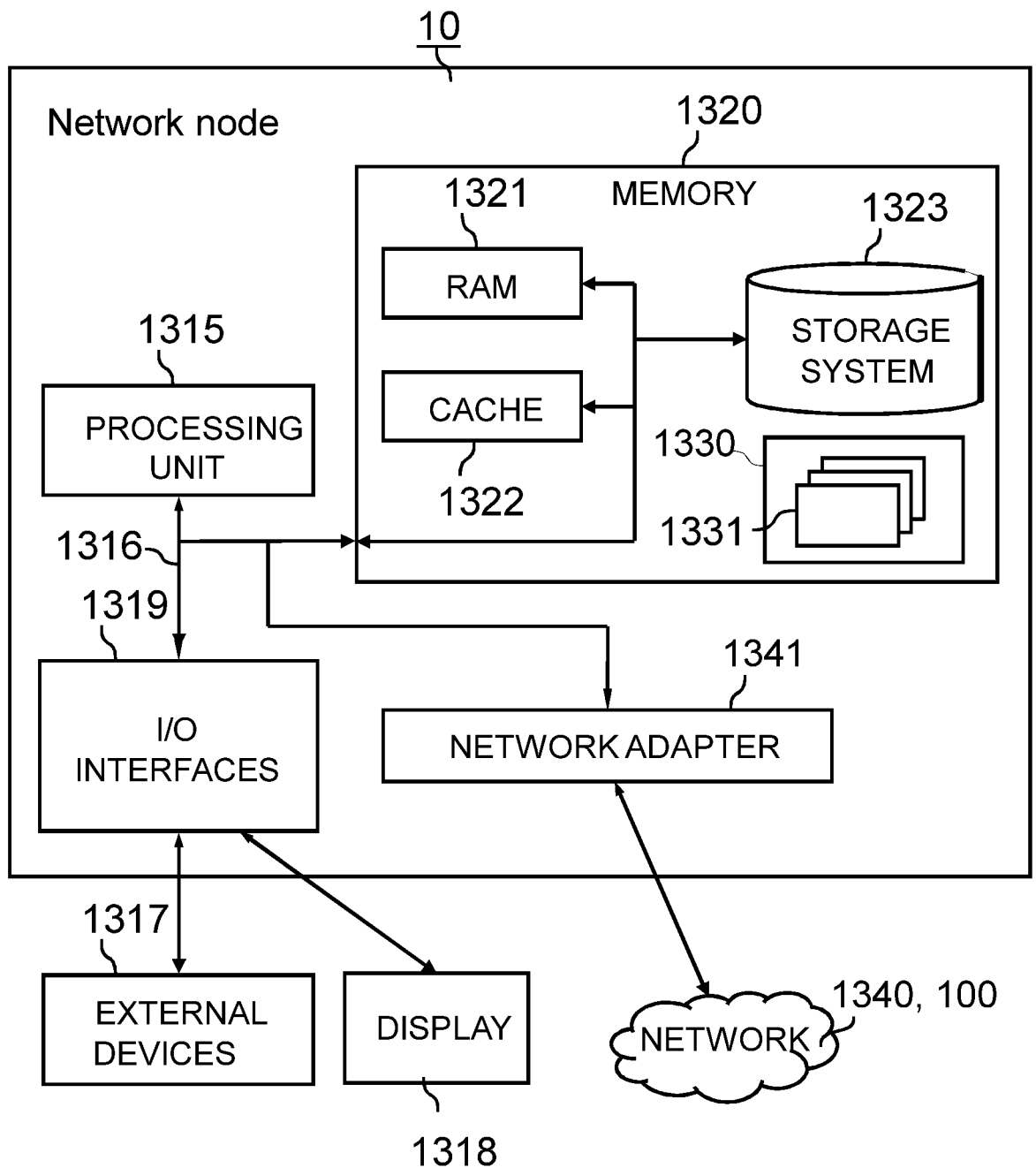
FIG. 13 shows an exemplary embodiment of a node according to an embodiment of the invention.

Referring now to FIG. 13, a more detailed block diagram of a network node 10 according to embodiments of the invention is shown, e.g. of the network 100 of FIG. 1. The network node 10 establishes a computing node that may perform computing functions and may hence be generally embodied as computing system or computer. The network node 10 may be e.g. a server computer. The network node 10 may be operational with numerous other general purpose or special purpose computing system environments or configurations.

The network node 10 may be described in the general context of computer system-executable instructions, such as program modules, being executed by a computer system. Generally, program modules may include routines, programs, objects, components, logic, data structures, and so on that perform particular tasks or implement particular abstract data types. The network node 10 is shown in the form of a general-purpose computing device. The components of network node 10 may include, but are not limited to, one or more processors or processing units 1315, a system memory 1320, and a bus 1316 that couples various system components including system memory 1320 to processor 1315.

Bus 1316 represents one or more of any of several types of bus structures.

Network node 10 typically includes a variety of computer system readable media.

System memory 1320 can include computer system readable media in the form of volatile memory, such as random access memory (RAM) 1321 and/or cache memory 1322. Network node 1310 may further include other removable/non-removable, volatile/non-volatile computer system storage media. By way of example only, storage system 1323 can be provided for reading from and writing to a non-removable, non-volatile magnetic media (not shown and typically called a "hard drive"). As will be further depicted and described below, memory 1320 may include at least one computer program product having a set (e.g., at least one) of program modules that are configured to carry out the functions of embodiments of the invention.

Program/utility 1330, having a set (at least one) of program modules 1331, may be stored in memory 1320 by way of example, and not limitation, as well as an operating system, one or more application programs, other program modules, and program data. Each of the operating system, one or more application programs, other program modules, and program data or some combination thereof, may include an implementation of a networking environment. Program modules 1331 generally carry out the functions and/or methodologies of embodiments of the invention as described herein. Program modules 1331 may carry out in particular one or more steps of a computer-implemented method for operating a distributed network, e.g. of one or more steps of the methods as described above.

Network node 10 may also communicate with one or more external devices 1317 such as a keyboard or a pointing device as well as a display 1318. Such communication can occur via Input/Output (I/O) interfaces 1319. Still yet, network node 10 can communicate with one or more networks 1340 such as a local area network (LAN), a general wide area network (WAN), and/or a public network (e.g., the Internet) via network adapter 1341. According to embodiments the network 1340 may be in particular a distributed network comprising a plurality of network nodes 10, e.g. the network 100 as shown in FIG. 1.

Aspects of the present invention may be embodied as a system, in particular a distributed network comprising a plurality of subnets, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

Aspects of the present invention are described herein with reference to flowchart illustrations and/or block diagrams of methods, networks, apparatus (systems), and computer program products according to embodiments of the invention. Computer readable program instructions according to embodiments of the invention may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of networks, systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

While there are shown and described presently preferred embodiments of the invention, it is to be distinctly understood that the invention is not limited thereto but may be otherwise variously embodied and practiced within the scope of the following claims.

The invention claimed is:

1. A computer-implemented method executable by one or more processors for operating a distributed network, the distributed network comprising a plurality of nodes, the network comprising one or more subnets, the method comprising
running a set of computational units;
assigning each of the computational units to one of the one or more subnets according to a subnet-assignment, thereby creating an assigned subset of the set of computational units for each of the subnets;
running on each node of the one or more subnets the assigned subset of the computational units, wherein the computational units are configured to execute computations in a deterministic manner, thereby replicating the assigned subsets of the computational units on replicas across a respective subnet;
running a consensus component, the consensus component being configured to reach a consensus on input blocks to be executed by the replicas of a respective subnet;
measuring, by each of the replicas of a subnet, replica-local data, wherein the replica-local data comprises non-deterministic measurands of the deterministic execution of the input blocks by the replicas;
reporting, by each of the replicas of a subnet, the replica-local data to the consensus component;
utilizing the replica-local data for an analysis of the computations executed across the respective subnet; and
taking one or more actions in dependence on the analysis of the replica-local data.

2. The computer-implemented method according to claim 1, wherein the replica-local data is data pertaining to the computations being locally executed by the replicas.

3. The computer-implemented method according to claim 1, wherein the replica-local data is non-deterministic data.

4. The computer-implemented method according to claim 1, wherein the replica-local data is data comprising numeric or enumerable quantities.

5. The computer-implemented method according to claim 1, further comprising computing, by the respective subnet, a set of geometric median values of the replica-local data across the subnet.

6. The computer-implemented method according to claim 5, the method further comprising
performing a statistical analysis of the set of geometric median values; and
taking one or more actions in dependence on a result of the statistical analysis of the set of geometric median values.

7. The computer-implemented method according to claim 6, further comprising
computing a deviation of the set of geometric median values from an expected value; and
taking the one or more actions in dependence on the deviation.

8. The computer-implemented method according to claim 6, further comprising
performing a statistical analysis of further data, the further data being in particular data which is publicly verifiable blockchain data; and
taking the one or more actions in dependence on the statistical analysis of the replica-local data, the set of geometric median values and/or the further data.

9. The computer-implemented method according to claim 8, wherein the further data is selected from a group consisting of:
a number of finalized blocks from each replica; and
a number of times that each replica has participated in a multi-signature.

10. The computer-implemented method according to claim 1, the analysis applying methods configured to ignore outliers, in particular a method that comprises a computation of a geometric median.

11. The computer-implemented method according to claim 1, further comprising
providing a time window for the reporting of the replica-local data by the replicas of the subnet.

12. The computer-implemented method according to claim 1, wherein the utilizing of the replica-local data for an analysis is performed by a system computational unit of the subnet.

13. The computer-implemented method according to claim 1, wherein the taking of the one or more actions is performed by a system computational unit of the subnet.

14. The computer-implemented method according to claim 1, wherein the replica-local data is selected from a group consisting of:
data on resource consumption of the computational units on a respective replica, in particular a wall clock time of execution and/or maximum memory allocated during execution;
data on resource consumption of users on a respective replica, in particular wall clock time and/or logical time of execution performed on behalf of the user, a maximum memory allocated during execution performed on behalf of the user;
for each other replica that a respective replica communicates with, data on measurements of communication parameters of the other replica with the respective replica, in particular latency, response time, down time and/or reliability;
for each other replica that a respective replica communicates with, data on measurements of semantic communication parameters of the other replica with the respective replica, in particular correctness according to a protocol specification; and
for each other replica on a respective subnet, data on measurements about activity of the other replica in a consensus protocol as observed by a respective replica, in particular a number of proposals of input blocks and/or a number of signature shares produced by the other replica.

15. The computer-implemented method according to claim 1, wherein the one or more actions are selected from a group consisting of:
adjusting bounds and/or prices for one or more of the computational units of the subnet;
adjusting bounds and/or prices for users of the distributed network; and
banning of replicas.

16. The computer-implemented method according to claim 1, further comprising
receiving, by the consensus component of a subnet,
inter-subnet messages from other subnets;
intra-subnet messages from replicas of a same subnet;
messages comprising reports of the replica-local data; and
external user messages of users of the network;
generating a queue of input blocks from the received messages according to a predefined consensus mechanism; and
executing the queue of input blocks by the replicas of the subnet.

17. The computer-implemented method according to claim 1, the method further comprising
executing on each node non-replicated computations of the computational units, and
wherein the replica-local data comprises measurands of the non-replicated executed computations.

18. A distributed network, the distributed network comprising one or more subnets, wherein each of the one or more subnets comprises a plurality of nodes, wherein the distributed network is configured to execute program instructions of a non-transitory computer readable storage medium, the program instructions executable by one or more processors of one or more of the plurality of nodes to cause the one or more of the plurality of nodes to perform a computer-implemented method comprising the steps of:
running a set of computational units;
assigning each of the computational units to one of the one or more subnets according to a subnet-assignment, thereby creating an assigned subset of the set of computational units for each of the subnets;
running, on each node of the one or more subnets, the assigned subset of the computational units, wherein the computational units are configured to execute computations in a deterministic manner, thereby replicating the assigned subsets of the computational units on replicas across a respective subnet;
running a consensus component, the consensus component being configured to reach a consensus on input blocks to be executed by the replicas of a respective subnet;
measuring, by each of the replicas of a subnet, replica-local data, wherein the replica-local data comprises non-deterministic measurands of the deterministic execution of the input blocks by the replicas;
reporting, by each of the replicas of a subnet, the replica-local data to the consensus component;

utilizing the replica-local data for an analysis of the computations executed across the respective subnet; and taking one or more actions in dependence on the analysis of the replica-local data.

19. A node of a distributed network, the node comprising one or processors being configured to execute program instructions of a non-transitory computer readable storage medium to perform a computer-implemented method comprising:

running an assigned subset of computational units, wherein the computational units are configured to execute computations in a deterministic manner, thereby replicating the assigned subset of the computational units on a replica;

running a consensus component, the consensus component being configured to reach a consensus on input blocks to be executed by the replica;

measuring, by the replica, replica-local data, wherein the replica-local data comprises non-deterministic measurands of the deterministic execution of the input blocks by the replicas;

reporting, by the replica, the replica-local data to the consensus component;

utilizing the replica-local data for an analysis of the computations executed across a respective subnet; and taking one or more actions in dependence on the analysis of the replica-local data.

20. A computer program product for operating a distributed network, the distributed network comprising one or more subnets, the computer program product comprising a non-transitory computer readable storage medium having program instructions embodied therewith, the program instructions executable by one or more processors of one or more of a plurality of nodes to cause the one or more of the plurality of nodes to perform a method comprising:

running a set of computational units;

assigning each of the computational units to one of the one or more subnets according to a subnet-assignment, thereby creating an assigned subset of the set of computational units for each of the subnets;

running, on each node of the one or more subnets, the assigned subset of the computational units, wherein the computational units are configured to execute computations in a deterministic manner, thereby replicating the assigned subsets of the computational units on replicas across a respective subnet;

running a consensus component, the consensus component being configured to reach a consensus on input blocks to be executed by the replicas of a respective subnet;

measuring, by each of the replicas of a subnet, replica-local data, wherein the replica-local data comprises non-deterministic measurands of the deterministic execution of the input blocks by the replicas;

reporting, by each of the replicas of a subnet, the replica-local data to the consensus component;

utilizing the replica-local data for an analysis of the computations executed across the respective subnet; and taking one or more actions in dependence on the analysis of the replica-local data.

* * * * *